March 31, 1959     R. C. KOCH     2,879,824
COATED TUBELESS TIRE CHAFER STRIP

Filed Aug. 10, 1955     3 Sheets-Sheet 1

INVENTOR.
ROBERT C. KOCH
BY W. A. Fraser
ATTY-

INVENTOR.
ROBERT C. KOCH
BY W. A. Fraser
ATTY.

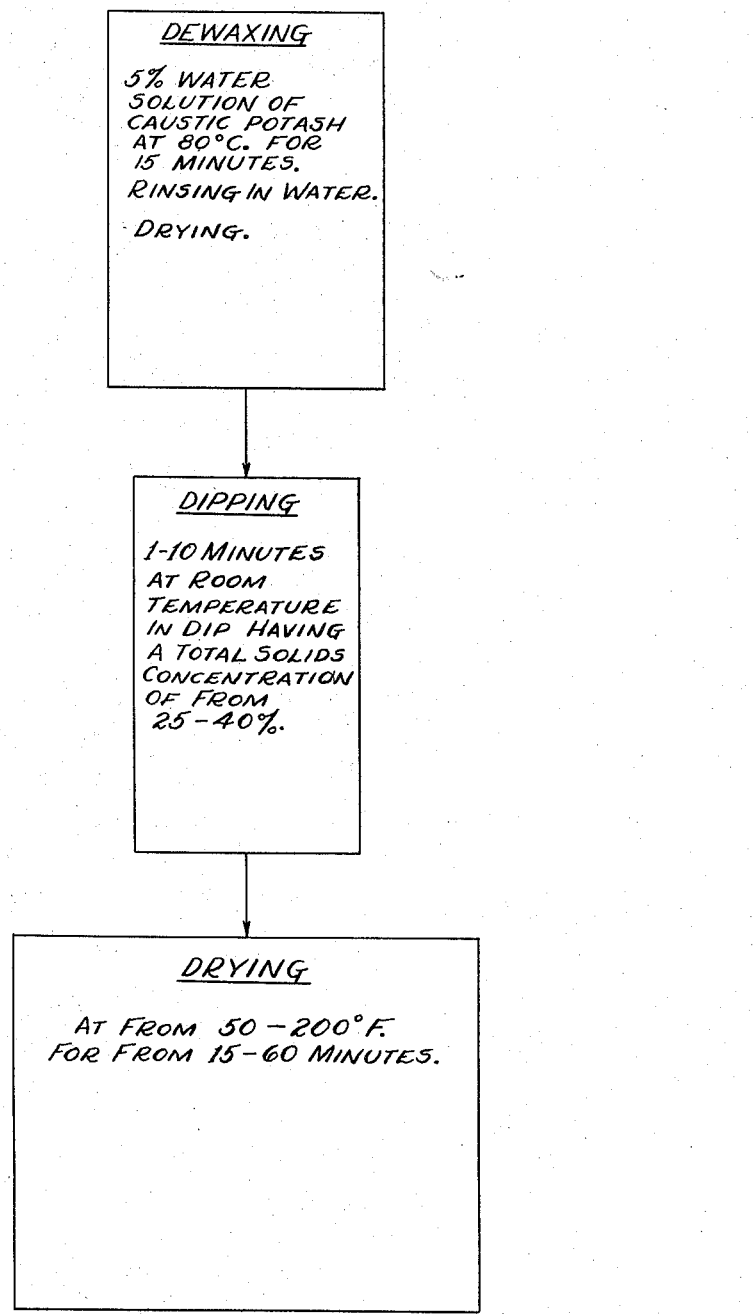

United States Patent Office 2,879,824
Patented Mar. 31, 1959

2,879,824

COATED TUBELESS TIRE CHAFER STRIP

Robert C. Koch, Akron, Ohio, assignor to The Firestone Tire & Rubber Company, Akron, Ohio, a corporation of Ohio Application August 10, 1955, Serial No. 527,555

1 Claim. (Cl. 152—362)

This invention relates to means for making pneumatic tires resistant to the escape of contained air. More particularly the invention relates to means for preventing the escape of air along the individual cords of the fabric chafer of pneumatic truck tires.

The development of pneumatic tires has led to a tire designed to hold air without an inner tube. The load-supporting air pressure in such a tire is contained by an air-impervious body obviating the bulky and expensive inner tube with attendant hot running of the tire during road service. To prevent the escape of air from such a tubeless tire, the inside surface of the inner wall of the tire cavity from bead to bead is provided with an inner liner of a rubbery air-impervious material usually comprising Butyl rubber alone or in combination with other rubber or plastic materials. To make a tubeless tire air-tight, it is necessary that special precautions be taken in the make up of the bead to prevent the escape of air from inside the tire casing if the bead is chafed or cut by the rim flange during road operation. Experience has shown that bead constructions satisfactory for retaining air in thin ply tubeless passenger tires operating at relatively low contained air pressures are not satisfactory for tubeless truck tires operating at higher contained air pressure.

The present invention provides a chafer of air-impervious fabric for a tubeless tire.

It is also an object of the invention to provide an improved air-impervious fabric chafer for a tubeless truck tire.

It is a further object of the invention to provide a method of making fabric impervious to air.

A further object of the invention is to provide a rubbery dispersion which will penetrate fabric cords to protect such cords from the infiltration of air.

A further object of the invention is to provide an air-impervious cotton chafer element for a tubeless tire.

These and other objects will become apparent with reference to the following specification, claim and drawings of which:

Fig. 6 is a flow sheet drawing with legends showing the steps of the invention.

Although the present invention is especially useful in large multi-ply tires operating at contained air pressures above the normal passenger tire air pressures of 24 p.s.i., the advantages of the invention are adaptable to all pneumatic tubeless tires.

Figure 1:
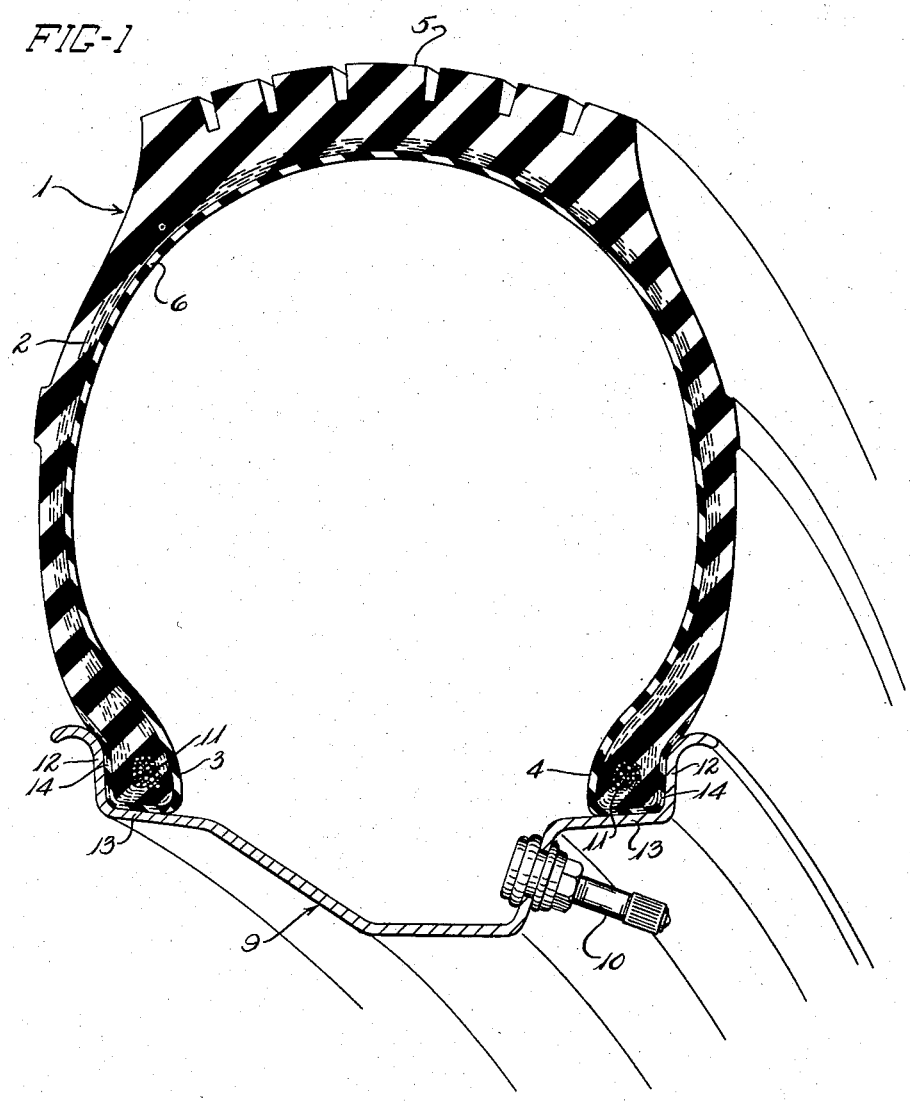
Fig. 1 is a fragmentary perspective view partially in section of a tire embodying the invention.

With reference to Fig. 1, tire 1 is comprised of a multi-ply fabric body portion 2 terminating at its edges in inextensible bead portions 3 and 4 and capped with an abrasion-resistant tread portion 5. An inner liner portion 6 is adhered to the inner-most ply of fabric body portion 2 and extends from the toe 7 of bead portion 3 around the inner wall of the air containing cavity to terminate at the toe 8 of bead portion 4. Inner liner 6 preferably, is comprised of an air-impervious rubbery material such as Butyl-type rubber or mixtures of such rubber with other rubbery or plastic materials. Tire 1 is mounted for road operation on rim 9 which is provided with a valve 10 for the introduction of air into the air cavity defined by rim 9 and tire 1.

Figure 2:
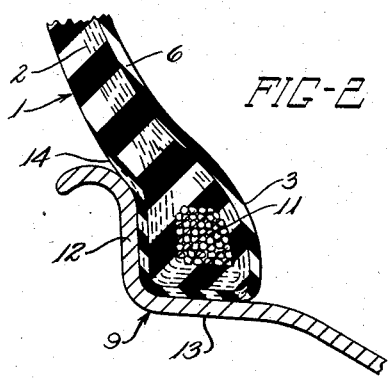
Fig. 2 is an enlarged fragmentary sectional view of a tire bead embodying the chafer element of the invention.

Fig. 2 is an enlarged section of bead 3 showing the construction of the fabric body plies 2 around bundle of bead wires 11. Bead 3 is supported against movement axially of the rim by rim flange 12 and supported radially by bead seat 13. During rotation of the tire during vehicle operation, deflection of the tire contacting the road causes the bead to rub against both the flange 12 and against the bead seat 13. This abrasive action eventually wears through the rubber and often exposes the fabric plies of body 2 at the bead. To protect the ply fabric of body 2 from such abrasive action, it is customary to cover the bead with a rubberized square woven fabric chafer element 14. The chafer element 14 may be comprised of one or more plies and in a conventional tire no precautions are necessary to make the fabric chafer plies impervious to the passage of air. However, in tubeless tires and particularly in tubeless truck tires, high air pressure in the air cavity pushes against and under the tire bead and if the fabric in chafer 14 is not impervious to the passage of air, air will penetrate the individual cords which then serve as conduits to wick air into the tire body to cause separation of the cord fabric plies, blistering of the sidewall rubber in the bead area or leaking to the atmosphere thereby reducing the internal load-supporting air pressure of the tire with undesirable results.

In the present invention this difficulty is overcome in that each cord of the fabric sheet is made impervious to the passage of air by use of a composition comprised of a latex of a terpolymer of a diene hydrocarbon, an aromatic substituted vinyl monomer and a vinyl pyridene monomer combined with a phenol and an aldehyde in a water dispersion. Such a dispersion will penetrate the individual dewaxed cords of a fabric sheet to exclude the undesired passage of air.

Sheets of cotton tire cord or square-woven fabric are soaked in such a dispersion for a period of time necessary to impregnate each cord. The fabric thus treated is dried to remove water and is then faced on its outer surface with a sheet of rubbery material by calendering in the conventional manner, cut into strips of the proper size for use as the chafer of a tire.

Figure 4:
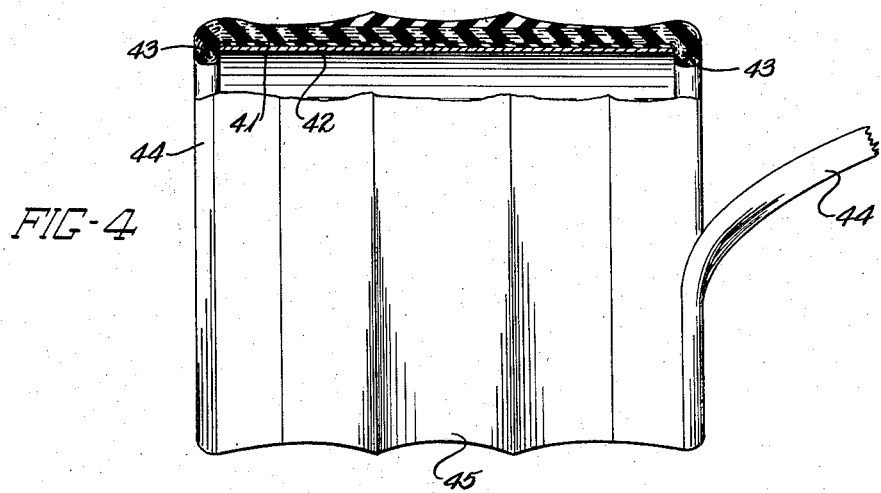
Fig. 4 is a front elevation of a tire building drum mounting a semi-finished tire and showing the position of the novel chafer of the invention during tire building.

As shown in Figure 4, an unvulcanized truck tire band is built by plying up lengths of rubberized fabric in a conventional manner with bead elements at each edge. The impregnated chafer fabric is applied over the bead covering an area from the axially inner edge or toe to a position well above that part of the bead portion which engages the rim flange when the tire is mounted on a wheel. Tread and sidewall portions 5 are applied over the body and the band is shaped and vulcanized to provide the finished vulcanized tire. The tire may be mounted on a wheel, the tire cavity filled with air under pressure through valve 10 and as the wheel rotates and the rim flange 12 and bead seat rubs the bead portion, no air will enter and seep along or through the cords.

In practicing the preferred form of the invention, the cotton cord or woven fabric is dewaxed by a suitable method such as treating with steam in the presence of ammonia, but more preferably by the use of a hot caustic solution. By the latter method the fabric is first immersed in a 5% solution of caustic potash, heated to 80° C. for about fifteen minutes and then rinsed and dried. Another method of dewaxing the cotton fabric before treatment with the dispersion is by scouring the fabric by pressure boiling in an alkali solution and then bleaching the fabric in a chlorine bath, rinsing with water and drying.

The bleached cord or square woven chafer is dipped in a dispersion of a latex of a rubbery terpolymer, mixed with a resorcinol-formaldehyde resin, and other compounding ingredients and allowed to soak for a period of from one to ten minutes. The solids concentration of the dispersion may be above 25% total solids by weight with a solids concentration of from 30-40% preferred. The saturated fabric is then slowly dried at a temperature of approximately 70° F. until most of the moisture has been removed, and the fabric is coated with a layer of vulcanized rubbery material by calendering or any other conventional method, slit into strips to provide the chafer strips for the tubeless tire. These strips are built into the tire in the aforementioned manner. Conventional tubeless tires fail in service because of the wicking of air from the inner air-containing cavity through the chafer fabric into the tire body. The present invention provides means for completely impregnating and covering the chafer fabric of air from the air-retaining cavity to various locations in the tire body to cause failure.

A tire when built according to the invention, mounted on a conventional drop center rim and inflated with air at a pressure of 24 lbs. per square inch performed satisfactorily as a load-bearing member for a car, without leaking air, separating in the plies, or blistering in the sidewalls.

An example of one dispersion useful in the invention follows, all parts being by weight of rubber hydrocarbon in the latex:

Example

| | |
|---|---|
| Latex terpolymer of butadiene-styrene-vinyl pyridene [1] | 100 |
| Formaldehyde | 7.60-9.60 |
| Resorcinol | 9.00-12.50 |
| Liquid caustic | 1.20-3.50 |
| Water total | 119.80-138.00 |

(Dissolve in water to a total solids content of at least 25% by weight.)

[1] The terpolymer is approximately 60% butadiene, 30% styrene and 10% vinyl pyridine.

In mixing the dispersion of the invention the caustic and the phenol-aldehyde portions are mixed together in water and immediately added to the latex. Since the total solids content in the final dispersion is high, care must be taken to use only enough water in the phenol-aldehyde mix to give the desired total solids in the finished dispersion. In making high solids dispersions of the invention, only a limited amount of water may be used to dilute the latex and the water added to the phenol aldehyde mix must serve as the bulk of the diluting water.

The dewaxed cotton fabric is soaked for at least 1 or 2 minutes and as long as ten minutes. Soaking even longer than ten minutes will not harm the fabric if the dispersion is kept slightly agitated and the fabric is immediately cleaned of excess dispersion when it is removed from the soaking tank. After the fabric is removed from the dispersion tank, it is dried slowly for at least 15 minutes and as much as or even more than an hour at a relatively low drying temperature. Room temperatures of from 50-70° F. are satisfactory although temperatures as high as 180° F. and even 200° F. are possible. Very rapid drying is to be avoided. For example, accelerated drying for 10 minutes at a temperature of 212° F., although removing the moisture does not produce a fiber cord which is impervious to passage of air.

Figure 5:
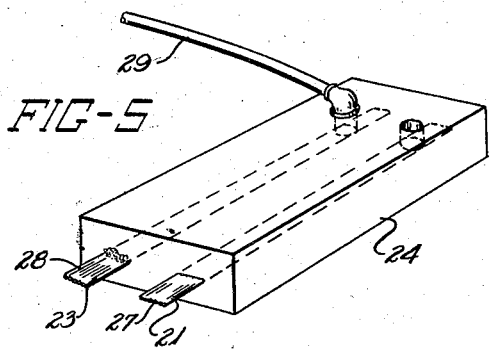
Fig. 5 is a perspective view of apparatus for testing the air-impervious character of fabric.

To test the air-impervious character of fabric, a strip 21, treated in the novel manner was laid on a quarter inch thick layer 22 of unvulcanized rubber (Fig. 5) beside an untreated strip 23. A second one quarter inch thick layer of unvulcanized rubber 24 was placed on the fabric test strips sandwich fashion and the rubber pressed and vulcanized between the platens of a vulcanizing press to form a pad. A small strip of rubber was removed from the vulcanized rubber layer to expose the cords of each test strip 21 and 23 for a distance of about one half inch from the edge of the pad. Soap solution was applied to the cord ends 27 and 28 at the edge of the pad and the nozzle 29 of an air hose connected to an 80 p.s.i. air line was pressed against the exposed fabric and air released (Fig. 5). Seepage of air through the cords of the fabric was noted by the rise of soap bubbles on the ends of cord at the edge of the pad. The fabric strip prepared in the novel manner allowed no air seepage with formation of bubbles while the untreated strip allowed air seepage with formation of bubbles at its cord ends at the edge of the pad.

Figure 3:
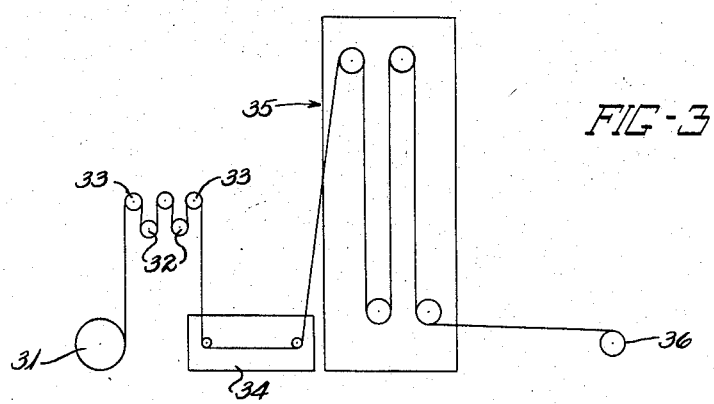
Fig. 3 is a schematic diagram of the apparatus used in practicing the invention.

Apparatus for practicing the invention is shown in Fig. 3 wherein a fabric letoff roll 31 pays out previously dewaxed cotton fabric which is drawn over a number of conventional idler rolls 32 and drive rolls 33, through one or more dip tanks 34 depending on the number of soakings necessary with a particular dispersion and through one or more conventional drying units 35 to evaporate the water and finally to a windup roll 36 where the air-impervious fabric is wound into a roll. Although the apparatus and method of Fig. 3 as has been described is appropriate for treating either weftless or square woven fabric, it is to be understood that the invention applied equally as well to single cords which may be later woven into fabric.

The fabric provided by the apparatus of Figure 3 is rubberized by calendering in the conventional manner and cut into strips of desired width to provide an unvulcanized tire chafer strip.

The air-impervious cord of the invention may be rubberized for example with a rubbery compound having the following formulation:

| | |
|---|---|
| Natural rubber | 100 |
| Carbon black | 50 |
| Zinc oxide | 2.5 |
| Softener | 8.5 |
| Antioxidant | 1.5 |
| Sulfur | 2.0 |
| Accelerator | 2.0 |
| | 166.5 |

The specific ingredients in the above formulation are well known to those versed in the compounding of tire body and chafer stocks.

In the preferred form of the invention the use of latex formed by the copolymerization of butadiene, styrene and vinyl pyridine in ratios respectfully of 60-70%, 15-30% and 5-10% is desired.

It is to be understood that the 1-3 diene hydrocarbon may be conjugated diolefins such as isoprene, chosen from butadiene-1,3; piperylene, 2,3-dimethyl butadiene-1,3; 1,2-dimethyl butadiene-1,3, and other such substituted open chain conjugated diolefins to mention only a few.

The vinyl pyridine type monomer may be selected from such vinyl pyridines as alpha-vinylpyridine (in which the pyridine ring is unsubstituted except for the vinyl group), 5-ethyl-2-vinylpyridine and 2-methyl-5-vinylpyridine. However, the invention broadly comprehends, the production of the vinylpyridine/diene hydrocarbon copolymer, the use of alpha, beta and gamma vinylpyridines and their homologues, e.g. 5-ethyl-2-vinylpyridine, 5-propyl-2-vinylpyridine, 5-butyl-2-vinylpyridine, 5-hexyl-2-vinylpyridine, 5-heptyl-2-vinylpyridine, 6-methyl-2-vinylpyridine, 4,6-dimethyl-2-vinylpyridine, 2-methyl-5-vinylpyridine, 2-methyl-4-vinylpyridine and other alkyl substituted vinylpyridines. Alpha vinylpyridine (2-vinylpyridine), 2-methyl-5-vinylpyridine, and 5-ethyl-2-vinylpyridine are preferred.

Other modifications of the invention will be obvious to those skilled in the art by reference to the specification and the following claim:

In the claim:

In a pneumatic open-bellied tubeless tire comprised of an inextensible fabric body portion terminating at its edges in two inextensible circular bead portions, a fabric chafer portion comprised of individual fabric elements extending from the inside air cavity of the tire to the outside of the tire, the fabric elements having been previously dewaxed and soaked in a water dispersion comprised of resorcinol and formaldehyde and latex comprised of butadiene, styrene and vinyl pyridine for from 1 to 10 minutes, said dispersion having a total solids concentration of not less than 25% by weight, and dried at a temperature not exceeding 200° F., said fabric chafer portion impervious to the passage of air both in a direction normal to the plane thereof and along the length of the elements whereby seepage of air from the tire cavity into the fabric body is prevented when the tire is mounted on the rim and inflated.

References Cited in the file of this patent

UNITED STATES PATENTS

| | | |
|---|---|---|
| 2,120,434 | Clayton | June 14, 1938 |
| 2,438,366 | Illingsworth | Mar. 23, 1948 |
| 2,477,336 | Jennings | July 26, 1949 |
| 2,484,620 | Glenn | Oct. 11, 1949 |
| 2,592,844 | Antonson | Apr. 15, 1952 |
| 2,619,445 | Kalafus | Nov. 25, 1952 |
| 2,681,331 | Howland | June 15, 1954 |
| 2,702,763 | Pritchard | Feb. 22, 1955 |
| 2,741,295 | Kindle | Apr. 10, 1956 |
| 2,752,978 | Kindle | July 3, 1956 |
| 2,776,699 | Kindle | Jan. 8, 1957 |
| 2,807,597 | Sonnenfeld | Sept. 24, 1957 |

FOREIGN PATENTS

| | | |
|---|---|---|
| 1,084,382 | France | Jan. 19, 1955 |